United States Patent
Halker et al.

(10) Patent No.: US 12,422,285 B2
(45) Date of Patent: Sep. 23, 2025

(54) MULTIPHASE VORTEX FLOWMETER SYSTEM

(71) Applicant: Halker Smart Solutions LLC, Centennial, CO (US)

(72) Inventors: Matthew Thomas Halker, Parker, CO (US); Paul S. Brennan, Grand Junction, CO (US); William Robert Myers, Englewood, CO (US); Joseph Michael Rzewnicki, Denver, CO (US); Mina Lee Weldon, Denver, CO (US); Kenneth Alan Barnett, Castle Rock, CO (US)

(73) Assignee: Halker Smart Solutions LLC, Centennial, CO (US)

(*) Notice: Subject to any disclaimer, the term of this patent is extended or adjusted under 35 U.S.C. 154(b) by 521 days.

(21) Appl. No.: 17/686,143

(22) Filed: Mar. 3, 2022

(65) Prior Publication Data
US 2022/0283003 A1 Sep. 8, 2022

Related U.S. Application Data

(60) Provisional application No. 63/155,877, filed on Mar. 3, 2021.

(51) Int. Cl.
*G01F 1/325* (2022.01)
*G01F 1/74* (2006.01)

(52) U.S. Cl.
CPC .............. *G01F 1/3259* (2022.01); *G01F 1/74* (2013.01)

(58) Field of Classification Search
None
See application file for complete search history.

(56) References Cited

U.S. PATENT DOCUMENTS

| | | | | |
|---|---|---|---|---|
| 5,551,305 | A * | 9/1996 | Farchi | G01F 1/36 73/861.04 |
| 6,810,719 | B2 * | 11/2004 | Dutton | G01N 9/002 73/861.04 |
| 7,580,801 | B2 | 8/2009 | Unsworth et al. | |
| 8,844,371 | B2 | 9/2014 | Limacher et al. | |
| 10,473,501 | B2 | 11/2019 | Parry et al. | |
| 10,704,939 | B2 | 7/2020 | Sapack et al. | |
| 10,877,001 | B2 | 12/2020 | Amir et al. | |
| 2006/0217899 | A1 * | 9/2006 | Unsworth | G01F 25/13 702/45 |
| 2015/0276445 | A1 | 10/2015 | Black et al. | |

FOREIGN PATENT DOCUMENTS

WO  WO 02/057722  7/2002

* cited by examiner

*Primary Examiner* — Matthew G Marini
(74) *Attorney, Agent, or Firm* — Cochran Freund & Young LLC

(57) ABSTRACT

A multiphase vortex flowmeter system determines the gas-to-liquid ratio (GLR) and flow rates from a well producing multiphase gas, oil and water by detecting the frequency and amplitude of vortices shed in a vortex flowmeter. In particular, the phase of the flow can be identified by detecting the change in the frequency of the vortices with respect to time, and the amplitude of the vortices. Based on the phase, the flow rates of liquid and gas can be calculated. As a feedback technique, these calculated values can be "tuned" by comparison with actual GLR and flow rates recorded for the well by a test separator.

8 Claims, 3 Drawing Sheets

MULTIPHASE VORTEX FLOWMETER SYSTEM

RELATED APPLICATION

The present application is based on and claims priority to the Applicant's U.S. Provisional Patent Application 63/155,877, entitled "Multiphase Vortex Flowmeter System," filed on Mar. 3, 2021.

BACKGROUND OF THE INVENTION

Field of the Invention

The present invention relates generally to the field of flowmeter systems for measuring gas and liquid production from a well. More specifically, the present invention discloses a system using a vortex flowmeter to measure multiphase well production.

Statement of the Problem

When an oil well is produced, a mixture of oil, gas, and water flow from the wellhead into a well pad production facility. A prevalent industry standard is to provide each well with a dedicated separation vessel, which separates the three-phase mixture into separate oil, gas, and water streams, so that production of each component can be closely monitored by traditional single-phase flow meters. Monitoring the performance of each individual new well is critical to maximizing production and revenue during the initial stages of a well's life. Fluctuations in production can be quickly identified and resolved if the data is available. Furthermore, later in a well's life, an electric submersible pump (ESP) is often employed downhole to bolster liquid production rates. Well production data collected after ESP installation can be used to diagnose ESP troubles more proactively, reducing the costs of maintenance and lost revenue from downtime.

Solution to the Problem

The present invention seeks to offer a comparable level of process monitorization at greatly reduced expense. The present invention is implemented by a variety of process instrumentation including a vortex flowmeter affixed to wellhead flowlines and well pad production separators, that transmit process information to a controller. This instrumentation is based on the principle of gathering as much process information as possible using inexpensive methods. For example, the present invention can rely on a combination of conventional instruments that can be easily fitted to wellhead flowlines transporting comingled oil, water, and gas to a well pad single-well separator. These flowline instruments feed the controller with process data used to calculate theoretical phase flow rates by detecting the frequency and amplitude of vortices shed in a vortex flowmeter.

In addition, in contrast to the prevalent industry standard practice, the present system requires only two separation vessels that are each fitted with conventional single-phase flow meters. One "bulk" vessel processes a majority of the produced fluids and one "test" vessel provides flow rates for custody transfer and data validation purposes. On typical multi-well facilities using dedicated separators, the resulting reduced equipment cost is substantial. The present system relies on an array of process instrumentation on each wellhead flowline as well as the bulk and test separation vessels. The present system also alerts users to the daily variation in production versus having to wait for a test cycle to be run.

SUMMARY OF THE INVENTION

This invention determines the gas-to-liquid ratio (GLR) and flow rates from a well producing multiphase gas, oil and water by detecting the frequency and amplitude of vortices shed in a vortex flowmeter. As a feedback technique, these estimated values can be "tuned" by comparison with actual GLR and flow rates recorded for the well by a test separator.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
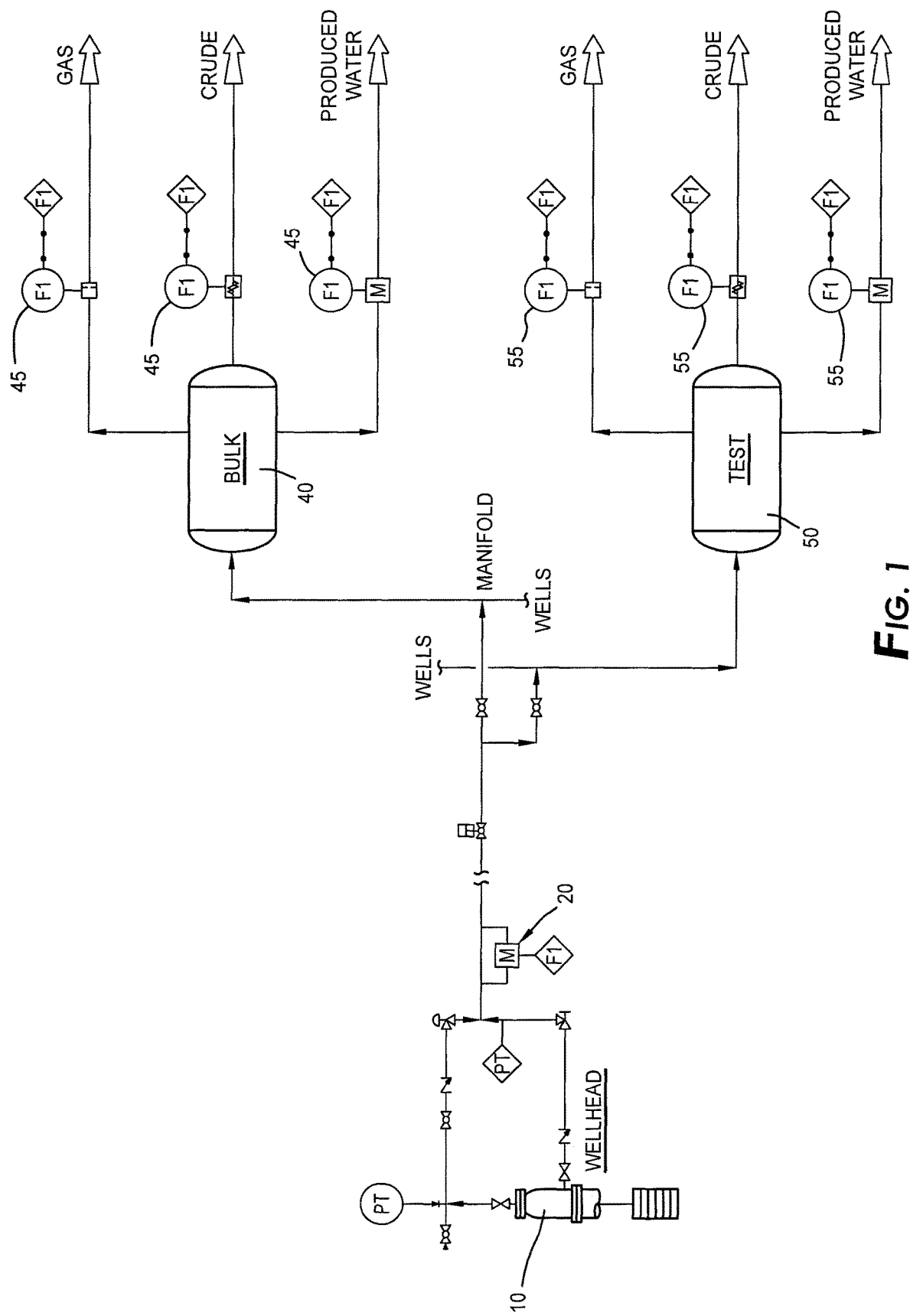
FIG. 1 is a block diagram of the present invention.

Turning to FIG. 1, a block diagram is provided of the present invention. The present invention is implemented by a variety of process instrumentation including a vortex flowmeter 20 affixed to wellhead 10 flowlines and well pad production separators that transmit process information to a computer-programmable controller 30, control panel, and process instrumentation. This instrumentation is based on the principle of gathering as much process information as possible using inexpensive methods. For example, the present invention can rely on a combination of conventional instruments that can be easily fitted to wellhead 10 flowlines transporting comingled oil, water, and gas to a well pad single-well separator 45. These flowline instruments will feed the controller 30 with process data to be used in an algorithm to calculate theoretical phase flow rates.

In field applications, the calculated flow rates can then be verified against feedback flow rate data collected from conventional single-phase meters 45, 55 on the outlet lines of conventional three-phase separators 40, 50. Typically, the single-phase meters 45, 55 used will consist of a Coriolis meter to measure oil flow rates, a mag meter to measure water flow rates, and an orifice plate to measure gas flow rates. These are conventional and reliable methods for measuring single-phase fluids. The resulting feedback loop will be used to calibrate the present invention algorithm.

Returning to FIG. 1, the co-mingled water, gas and oil produced from the wellhead 10 passes through the vortex flowmeter 20. This vortex flowmeter 20 has a flow passageway containing a bluff body (e.g., a triangular cylinder or shedder bar extending across the flow passageway) that induces turbulence in the flow through the passageway. When the medium flows around the bluff body at a certain speed, an alternately-arranged vortex belt is generated behind the sides of the bluff body, called the "von Kármán vortex." Since both sides of the vortex generator alternately generate the vortex, a pressure pulsation is generated on both sides of the body, which results in an alternating stress. A sensor (e.g., a piezoelectric transducer, pressure sensor or strain gauge) downstream from the bluff body can be used to detect both the frequency and amplitude off the vortices. For example, a piezoelectric element can be employed to generate an alternating charge signal with the same frequency as the vortex under the action of this alternating stress. The frequency of these pulses is directly proportional to flow rate. This signal also has an amplitude indicating the strength or amplitude of the vortices. The signal is sent to a controller 30 to be processed after being amplified by the pre-amplifier.

In certain range of Reynolds number (about $2\times10^4$ to about $7\times10^6$), the relationship among vortex releasing frequency, fluid velocity, and vortex generator facing flow surface width can be expressed by the following equation:

$$f = St \times V/d$$

where f is the releasing frequency of the vortices, St is the Strouhal number, V is velocity, and d is the width of the triangular cylinder. This is discussed in greater detail in PCT Pub. No. WO 2002/057722 (Clarke et al.), which is incorporated herein by reference.

Typically, a vortex flowmeter is used to measure fluid flow in a homogenous flow regime, in that is they are configured to measure a specific gas or flowing liquid. A co-mingled flow of a gas/liquid mixture creates an issue as the vortices vary in frequency and amplitude as the flowing fluid density changes. For this reason, a vortex flowmeter is typically not used to measure multiphase fluids.

However, in the present invention, these changes in the vortex frequency and amplitude are monitored and used to recognize phase changes in the fluids produced from a well. When the flowing fluid is in a gaseous state, the amplitude is low, and the frequency is high. Conversely, when the flowing fluid is in a liquid state, the amplitude is high, and the frequency is low. While in a multiphase flow, the frequency oscillates greatly (i.e., varies widely). The following is an example of an algorithm that can be used to determine the fluid phase:

Take the absolute value of change in frequency and divide by change in time

Take a 5-second average of that derivative the value of the 5-second average is greater than Constant1, then the fluid is multiphase;

If the value is less than Constant1 and the meter amplitude is greater than Constant2, then the fluid is liquid phase;

If the value is less than Constant1 and the meter amplitude is less than Constant2, then the fluid is gas phase.

For example, for a 2 in. schedule 80 meter run, Constant1=220,000 and Constant2=30. Corresponding pseudo-code for the algorithm to detect the fluid phase is provided below:

```
Every Second:
// Calculate the change in frequency since the last sample
Vortex_Frequency_Average_work_var_phase =
    AbsoluteValue(Vortex_Frequency_Phase_Last_Sample – Vortex_Frequency);
// Calculate change in time
Time_In_Seconds = GetSecondsSinceMidnight( );
Time_of_Day_as_Fraction = Time_Seconds / 86399;
Change_in_time = Time_of_Day_as_Fraction –
    Time_Stamp_at_last_phase_sample;
// Calculate the change in frequency as a function of time
Delta_Freq = Vortex_Frequency_Average_work_var_phase / Change_in_time;
// Sum the change for averaging
Delta_Freq_work_var = Delta_Freq_work_var + Delta_Freq;
// Store frequency and time for next sample calculation
Time_Stamp_at_last_phase_sample = Time_of_Day_as_Fraction;
Vortex_Frequency_Phase_Last_Sample = Vortex_Frequency;
After 5 seconds:
If (Delta_Freq_Final >= Constant1) then
    Phase= multiphase;
Else
    If (Vortex_Amplitude_Average > Constant2) then
        Test_phase = liquid;
    Else
        Test_phase = gas;
    Endif
Endif
```

Figure 3:
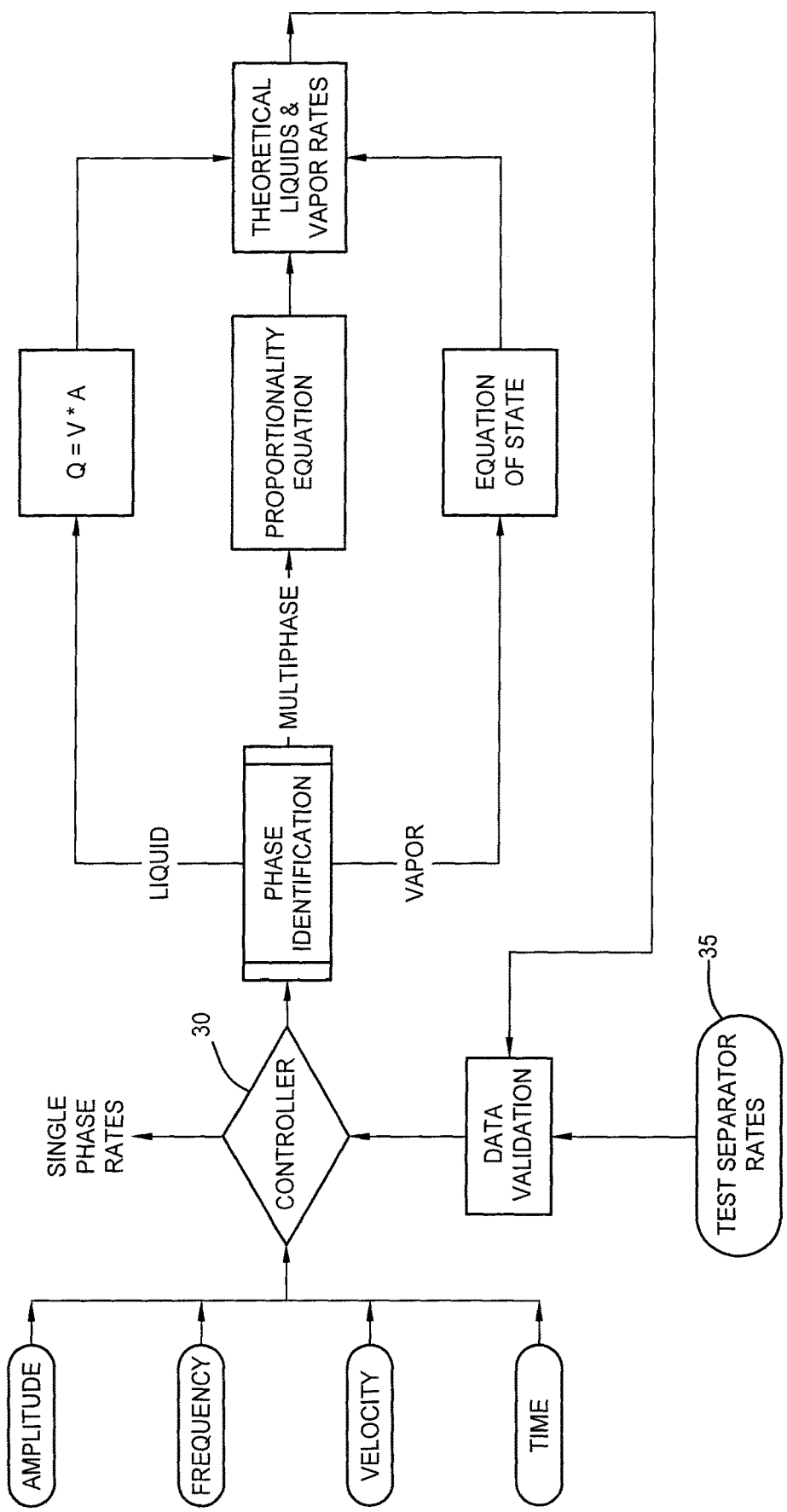
FIG. 3 is an algorithm flowchart for the present invention.

Flow measurements are then made for each of fluid phases by the controller 30, as shown in FIG. 3. Since the vortex flowmeter outputs the velocity of the flowing fluid, the standard Q=V*A function can be used to calculate the liquid flow when the liquid phase is detected and the gas flow while gas is detected (where V is the flow velocity and A is the area of the meter run). The actual flow is calculated and then converted to standard conditions with temperature and pressure inputs.

For multiphase flow, the velocity can be averaged over time and the total velocity recorded by the vortex flowmeter is then allocated to the liquid flow calculation and the gas flow calculation by means of using the averaged frequency and amplitude to determine a proportion of liquid-to-gas in the flow regime. As previously discussed, a higher frequency and lower amplitude indicates that a higher proportion of the flow is gas, and a lower frequency and higher amplitude indicates that a higher proportion of the flow is liquid. The pseudocode provided below illustrates the algorithm for multiphase velocity allocation:

```
// Populate the velocity value that will be used for flow calc. It will be different
for each phase type
Switch (Phase)
Case 1:
    Vortex_Velocity_Calc_Value_Liquid = Vortex_Velocity_Average;
    Vortex_Velocity_Calc_Value_Gas = 0.0;
    Vortex_Gas_Meter_Correction_Final = Vortex_Gas_Meter_Correction;
Break
Case 2:
    Vortex_Velocity_Calc_Value_Liquid = (Vortex_Liquid_Flow_Velocity *
        Vortex_MultiPhase_Liquid_Factor);
    Vortex_Velocity_Calc_Value_Gas = (Vortex_Gas_Flow_Velocity *
        MultiPhase_Gas_ Factor);
    If (Vortex_Frequency_Average_MCF > C5) then
        Vortex_Gas_Meter_Correction_Final = (Vortex_Gas_Meter_Correction
            + ((Vortex_Frequency_Average_MCF) – C4) * C6));
    Else
        Vortex_Gas_Meter_Correction_Final = Vortex_Gas_Meter_Correction;
    Endif
Break
Case 3:
    Vortex_Velocity_Calc_Value_Gas = Vortex_Velocity_Average;
    Vortex_Velocity_Calc_Value_Liquid = 0.0;
    If (Vortex_Velocity_Average > C2) then
        Vortex_Gas_Meter_Correction_Final = ((Vortex_Velocity_Average
            – C2) * C7) + (Vortex_Gas_Meter_Correction);
    Else
        Vortex_Gas_Meter_Correction_Final = Vortex_Gas_Meter_Correction;
    Endif
Break
Endswitch
(where C2, C4, C5 and C7 are constants determined by the flow run size)
```

The liquid flow and gas flow can then be calculated from this velocity allocation using the pseudocode provided below:

```
// Liquid flow rate calc
// Q gal/min = A * V * gal/ft * seconds/min
Vortex_Liquid_Flow_Rate_GPM = ((((Vortex_Pipe_Area *
    Vortex_Velocity_Calc_Value_Liquid) * 7.48052) * 60) *
    Vortex_Liquid_Meter_Correction);
// test for edge case of liquid flow rate being too high
If (Vortex_Liquid_Flow_Rate_GPM > Vortex_max_liquid_flow_rate) then
    Vortex_Liquid_Flow_Rate_GPM = Vortex_max_liquid_flow_rate;
Endif
Vortex_Liquid_Flow_Rate_Bbl = ((Vortex_Liquid_Flow_Rate_GPM / 42) * 1440);
// Gas flow rate and ACFM to SCFM conversion
Vortex_Gas_ACFM_Temp = (((Vortex_Velocity_Calc_Value_Gas *
    Vortex_Pipe_Area * 60) * Vortex_Gas_Meter_Correction_Final);
Vortex_Gas_Rate_ACFD = Vortex_Gas_ACFM * 1440;
Temp_Calc = ((Static_pressure +PBaro) / Base_Pressure);
Temp_Calc2 = (519.67 / (Flow_temperature + 459.67));
Temp_Calc3 = (1 / 0.9887);
SCFM_Temp = Vortex_Gas_ACFM * Temp_Calc * Temp_Calc2 * Temp_Calc3;
// Convert gas flow to standard cubic feet per day
Vortex_gas_flow_Rate_SCF_Day = Vortex_gas_flow_rate_SCFM * 1440;
// Calculate the Gas to Liquid ratio
Ratio = Vortex_gas_flow_Rate_SCF_Day / Vortex_liquid_flow_Rate_Bbl;
```

Optionally, the present system allows the predicted flow rate calculations to be tuned or corrected using feedback from the actual production flow rates 35 measured by the individual phase flowmeters 45 at the bulk separation vessel 40. As each well transitions into a well test phase, the corrected daily totals for oil, water and gas production from the bulk separation vessel 40 can be compared to the estimated values calculated by the present system, as described above. Additionally, each flow phase meter correction factor can be tuned as the present system monitors its flow calculations against the test system 50, 55 during each flow phase as detected by the algorithms described above.

The associated meter correction factors are then updated as feedback to the present system. The following steps can be used to provide for this meter correction feedback:

Read oil, water and gas flow rates from test separator 50, 55
Integrate flow rates into phase detection in the present system
Monitor instantaneous rates for each flow phase calculation function (liquid, multi-phase and gas)
Create correlation between instant flow rates and daily flow totals to update the correction factors.
Use total oil and water totals from test system to update well water cut percent variable used by the controller.

Figure 2:
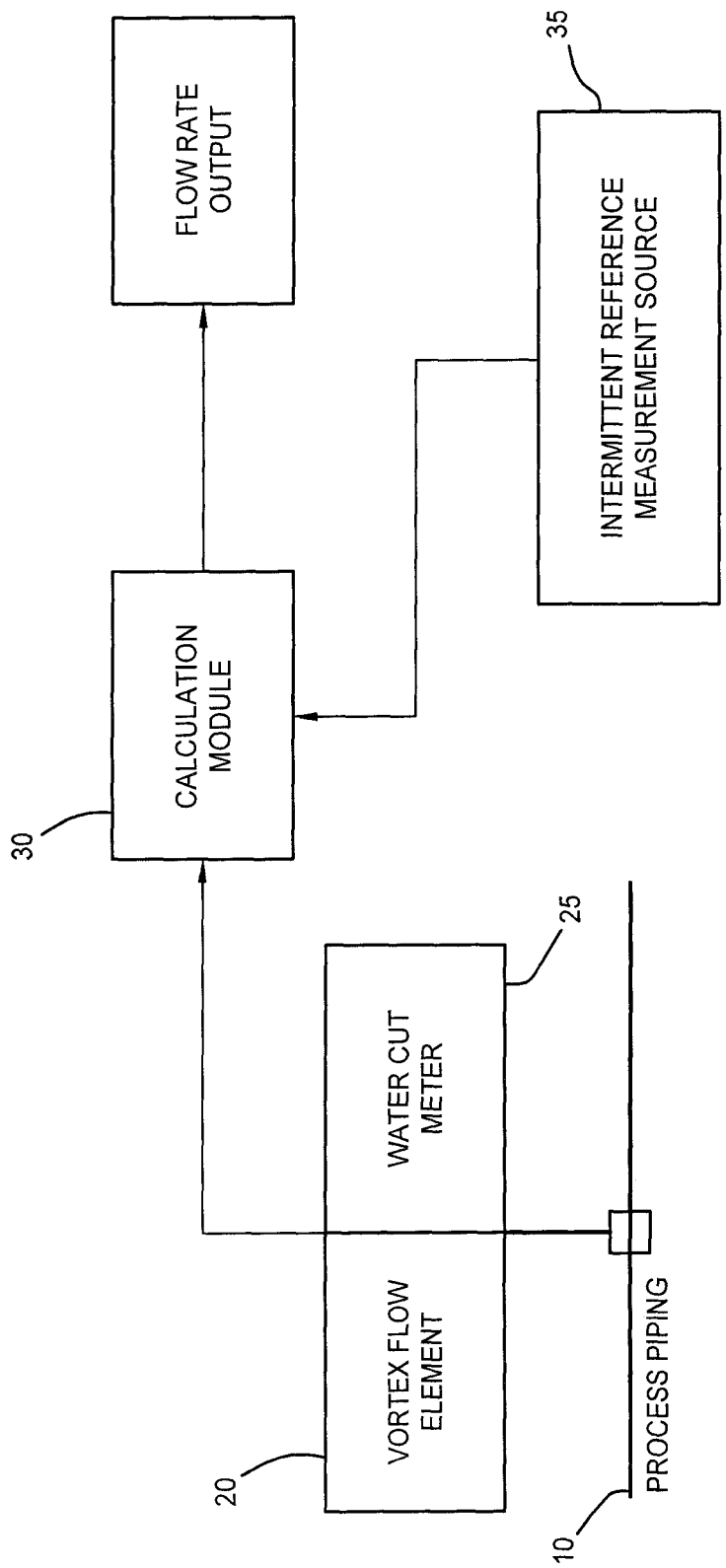
FIG. 2 is another block diagram providing a system overview of another embodiment of the present invention that includes a water cut meter to enable calculation of the gas-to-oil ratio (GOR) from the calculated gas-to-liquid ratio (GLR).

Optionally, a water cut measurement can be integrated into the present system to calculate the gas-to-oil ratio (GOR) from the calculated gas-to-liquid ratio (GLR). With the addition of a water cut meter input 25 (as shown in FIG. 2) reading the water cut instream in real time as the process flows, the calculated liquids totals could be separated into produced water and produced oil by taking the total liquid flow calculation multiplied by the water cut input. Typical water cut technologies include dielectric measurement using capacitance, gamma ray, infrared, or radio wave technologies. The following steps can be used for this GOR calculation while calculating instream flow rates:

Read the water cut input from the water cut meter

Multiply the water cut percentage by the total liquid flow rate to obtain total water flow rate Subtract the total water flow rate from the total liquid flow rate to determine the total oil flow rate Use the water and oil flow rates as inputs to the water and oil volume totalizers.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for measuring the flow of co-mingled gas and liquid produced from a well, said method comprising:
   providing a vortex flowmeter measuring fluid velocity and having a flow passageway for co-mingled gas and liquid containing a bluff body inducing turbulent vortices in the fluid flow through the passageway;
   detecting the frequency of the vortices;
   detecting the amplitude of the vortices; and
   determining the phase of the fluid flow by the following steps:
   (a) if the amplitude of the vortices is less than a first predetermined value and the frequency of the vortices is greater than a second predetermined value, the fluid is gas phase;
   (b) if the amplitude of the vortices is greater than a first predetermined value and the frequency of the vortices is less than a second predetermined value, the fluid is liquid phase; and
   (c) if the frequency of the vortices varies widely over time, the fluid is multiphase;
   if the fluid phase is liquid or gas, calculating the flow based on the fluid velocity measured by the vortex flowmeter; and
   if the fluid is multiphase, calculating the liquid and fluid flows based on the frequency and amplitude of the vortices to determine the proportion of liquid-to-gas in the flow, and the fluid velocity measured by the vortex flowmeter.

2. The method of claim 1 further comprising calibrating the calculated flows of liquid and gas in the flow against actual production from the well.

3. The method of claim 1 further comprising:
   providing a water cut meter to determine the proportion of water in the flow produced by the well; and
   calculating the flow of oil produced by the well by reducing the calculated liquid flow by the proportion of water in the flow.

4. The method of claim 1 wherein changes in the frequency of the vortices are calculated by an average of the derivative of the frequency with respect to time over a predetermined period of time.

5. A method for measuring the flow of co-mingled gas and liquid produced from a well, said method comprising:
   providing a vortex flowmeter measuring fluid velocity and having a flow passageway for co-mingled gas and liquid containing a bluff body inducing turbulent vortices in the fluid flow through the passageway;
   detecting the frequency of the vortices;
   detecting the amplitude of the vortices; and
   determining the phase of the fluid flow by the following steps:
   (a) if the absolute value of the change in the frequency of the vortices with respect to time is greater than a first predetermined value, the fluid is multiphase;
   (b) if the absolute value of the change in the frequency of the vortices with respect to time is less than the first predetermined value and the amplitude of the vortices is greater than a second predetermined value, the fluid is liquid phase; and
   (c) if the absolute value of the change in the frequency of the vortices with respect to time is less than the first predetermined value and the amplitude of the vortices is less than the second predetermined value, the fluid is gas phase;
   if the fluid phase is liquid or gas, calculating the flow based on the fluid velocity measured by the vortex flowmeter; and
   if the fluid is multiphase, calculating the liquid and fluid flows based on the frequency and amplitude of the vortices to determine the proportion of liquid-to-gas in the flow, and the fluid velocity measured by the vortex flowmeter.

6. The method of claim 5 further comprising calibrating the calculated flows of liquid and gas in the flow against actual production from the well.

7. The method of claim 5 further comprising:
   providing a water cut meter to determine the proportion of water in the flow produced by the well; and
   calculating the flow of oil produced by the well by reducing the calculated liquid flow by the proportion of water in the flow.

8. The method of claim 5 wherein the absolute value of the change in the frequency of the vortices with respect to time is calculated by an average of the derivative of the frequency with respect to time over a predetermined period of time.

* * * * *